United States Patent [19]

Feintuch

[11] Patent Number: 5,420,827
[45] Date of Patent: May 30, 1995

[54] PASSIVE MULTIPATH TARGET RANGE AND DEPTH ESTIMATION USING A VARIABLE DEPTH SONAR

[75] Inventor: Paul L. Feintuch, Covina, Calif.

[73] Assignee: Hughes Aircraft Company, Los Angeles, Calif.

[21] Appl. No.: 628,193

[22] Filed: Jul. 6, 1984

[51] Int. Cl.⁶ .............................................. G01S 3/80
[52] U.S. Cl. .................................................. 367/127
[58] Field of Search ............... 367/118, 120, 124, 125, 367/126, 127, 129, 130

[56] References Cited

U.S. PATENT DOCUMENTS

| 4,198,704 | 4/1980 | Munson | 367/125 |
|---|---|---|---|
| 4,312,053 | 1/1982 | Lipsky | 367/127 |

Primary Examiner—Daniel T. Pihulic
Attorney, Agent, or Firm—Robert Thompson; Wanda K. Denson-Low; Georgann S. Grunebach

[57] ABSTRACT

A variable depth sonar is disclosed which is adapted to provide passive multipath target ranging and depth estimates. The sonar employs a novel estimation procedure which is adapted to sonars with relatively small sensors and limited computing power. A novel feature of the invention is the introduction of a change of depth of the sonar receiver, mounted on a mobile platform, into the estimation process. Measurements at the two different depths are combined to provide target range and depth.

Other features and improvements are disclosed.

11 Claims, 3 Drawing Sheets

PASSIVE MULTIPATH TARGET RANGE AND DEPTH ESTIMATION USING A VARIABLE DEPTH SONAR

BACKGROUND OF INVENTION

1. Field of the Invention

The present invention is related to the field of passive sonar, and more particularly to passive sonar systems adapted to provide target range and depth information.

2. Description of the Prior Art

Passive sonar systems, unlike active systems that can send out energy and await an echo return, must obtain range estimates based entirely on target radiated energy. Most passive sonar systems do not provide estimates of the range to targets that have been detected. Those systems that do provide estimates obtain time difference data either between largely separated array subsections or between complicated multipath signal structures. Thus, unless the sonar has a large aperture array or an extremely large computer to correlate multipath returns with all possible multipath structures, the estimate of range is not obtained.

It is, therefore, an object of the present system to provide a passive sonar system adapted to provide target and range information.

A further object of the invention is to provide a passive sonar system employing a relatively small sensor with limited computing power which is adapted to provide target range and depth information.

Yet another object of the present invention is to provide a simple range and depth estimation technique for mobile sonar systems.

SUMMARY OF THE INVENTION

A variable depth mobile sonar is disclosed which is adapted to estimate target range and depth. It is assumed that acoustic energy is propagated from the target to the sonar via a direct path and a surface reflected path. The invention utilizes multipath time differences at different depths to provide both range and depth estimates of the target. Passive measurements are taken at two different depths. Based upon the known sonar receiver depths, the velocity of the sonar receiver, and the path length differences estimated by utilizing the autocorrelation function of the received waveform, estimates of the target depth and range are calculated using novel algorithms.

Other features and advantages are disclosed.

BRIEF DESCRIPTION OF THE DRAWINGS

The various objects, features and advantages of the disclosed invention will be readily appreciated by persons skilled in the art from the following detailed disclosure when read in conjunction with the accompanying drawings, wherein.

DETAILED DESCRIPTION OF THE PREFERRED EMBODIMENT

The present invention comprises a novel variable depth mobile passive sonar system. The following description of the invention is provided to enable any person skilled in the art to make and use the inventions. Various modifications to the disclosed embodiment will be readily apparent to those skilled in the art, and the general principles defined herein may be applied to other embodiments. Thus, the present invention is not intended to be limited to the embodiment shown, but is to be accorded the widest scope consistent with the principles and novel features of the invention.

The invention is adapted for use on a mobile platform such as by way of example only, a variable depth towed sonar, submarine or torpedo. The properties exploited in the preferred embodiment are that (1) the platform can compare estimates or measurements made at different known depths, and (2) for a submerged target, the acoustic energy propagation is primarily via a direct and a surface reflected path.

For the purposes of the preferred embodiment, the direct propagation path is assumed to be straight-line, and the reflection form the surface for the reflected path is assumed to be perfect. The source is assumed to be stationary and a strong emitter of acoustic energy, and to be much farther from the platform than its depth. The platform is assumed to be moving horizontally, i.e., at a constant depth and at a constant speed, and its depth is assumed known without error.

Figure 1:
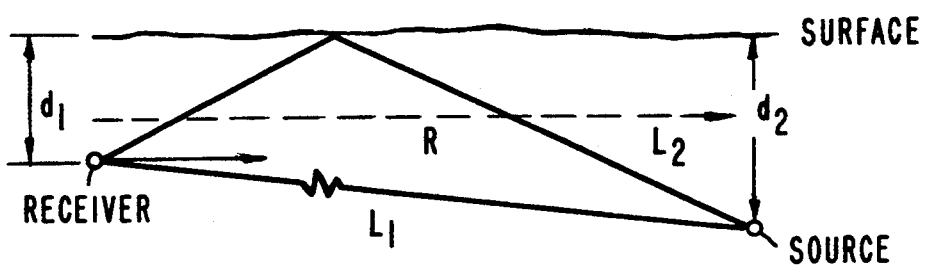
FIG. 1 is a diagram illustrating the relative underwater locations of the sonar platform and the target, and defining several pertinent parameters.

FIG. 1 depicts these assumed conditions, where
$d_1$ = platform depth
$d_2$ = target depth
v = platform speed
c = sound speed in the medium
R = horizontal range to target
$L_1$ = length of direct propagation path
$L_2$ = length of surface reflected path
s(t) = source random radiated waveform (from target)
y(t) = waveform received at the platform If the signal s(t) is very strong, the noise may be neglected at the platform receiver. The received waveform y(t) is the sum of the signals delayed from the two propagation paths, $$y(t) = s\left(t - \frac{L_1}{c}\right) + s\left(t - \frac{L_2}{c}\right) \quad (1)$$

The autocorrelation function for the signal s(t) may be denoted by $R_s(\tau)$, and the received signal y(t) autocorrelation function may be denoted by $R_y(\tau)$. The difference $\Delta$ in the propagation times between the direct signal path $L_1$ and the surface reflected signal path is $(L_2-L_1)/c$. Thus, the relationship between the two autocorrelation functions for the received signal y(t) may be expressed by Equation 2.

$$R_y(\tau) = 2 R_s(\tau) + R_s(\tau + \Delta) + R_s(\tau - \Delta) \quad (2)$$

The received autocorrelation function $R_y(\tau)$ contains the signal correlation function $R_s(\tau)$ shifted by $\Delta$ seconds from the origin, i.e., shifted by the time difference for propagation over the two paths. For strong signals, the peaks in the autocorrelation function are easily detected, and thus a good estimate of the time difference $\Delta$ is obtained from the difference between peaks in the received autocorrelation function $R_y(\tau)$.

The assumption that the range of the target is much greater than its depth implies that $L_1^2 >> d_1 d_2$ and that $L_1 \approx R$. It is straight-forward to show that $$c \Delta \approx L_2 - L_1 \approx \frac{2 d_1 d_2}{L_1} \approx \frac{2 d_1 d_2}{R} \quad (3)$$

Figure 2:
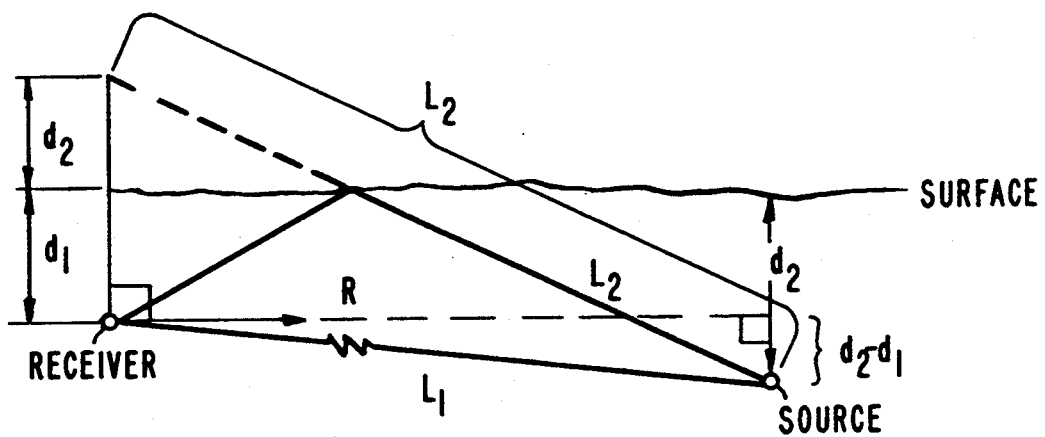
FIG. 2 is a modification of the diagram of FIG. 1, illustrating the geometric approximations used to derive the estimation algorithms.

Reference to FIG. 2 illustrates the assumed geometric relationships by which the approximations of Equation 3 are reached. The triangle whose longest side is of length $L_2$ has second and third sides of length R and $(d_1+d_2)$. Since it is assumed that the target's range is much greater than its depth, this triangle is assumed to be a right triangle. Hence the relationship of Equation 4 is obtained.

$$L_2^2 \approx R^2 + (d_1+d_2)^2 \quad (4)$$

Similarly, the right triangle whose hypotenuse is $L_1$ has sides of length R and $(d_2-d_1)$, from which the relationship of Equation 5 is obtained.

$$L_1^2 = R^2 + (d_2-d_1)^2 \quad (5)$$

The relationship of Equation 3 follows readily from the relationship of Equation 4 and 5, and the use of the approximation that $$(1 + a)^{\frac{1}{2}} \approx \left(1 + \frac{1}{2} a\right),$$

where $a << 1$.

The relationship of Equation 3, with two measurements of the time difference $\Delta$, at two different times and depths, is used to solve for the unknowns $d_2$ and R that are the parameters to be estimated.

At time $t_1$, the platform depth $d_1(t_1)$, its velocity v, and the time difference $\Delta(t_1)$ is measured from the correlation function. Thus, at time $t_1$, $$\Delta(t_1)c \approx \frac{2 d_1(t_1) d_2}{R} \quad (6)$$

The platform then changes depths. At time $t_2$, the new platform depth $d_1(t_2)$ and time difference $\Delta(t_2)$ are measured. Since it is assumed that the target was not moving at all, and the platform is heading directly to the target (which is reasonable for high signal-to-noise ratio), the range to the target is reduced by the velocity times the time interval between measurements.

$$\Delta(t_2)c \approx \frac{2 d_1(t_2) d_2}{R - v(t_2 - t_1)} \quad (7)$$

From the relationships for the measurements at the two times $t_1$, $t_2$, a solution is available for R and $d_2$:

$$R \approx \frac{v(t_2 - t_1) \Delta(t_2) d_1(t_1)}{\Delta(t_2) d_1(t_1) - \Delta(t_1) d_1(t_2)} \quad (8)$$

$$d_2 \approx \frac{R \Delta(t_1) c}{2 d_1(t_1)} \quad (9)$$

Thus, the preferred embodiment provides approximate range and target depth.

Figure 3:
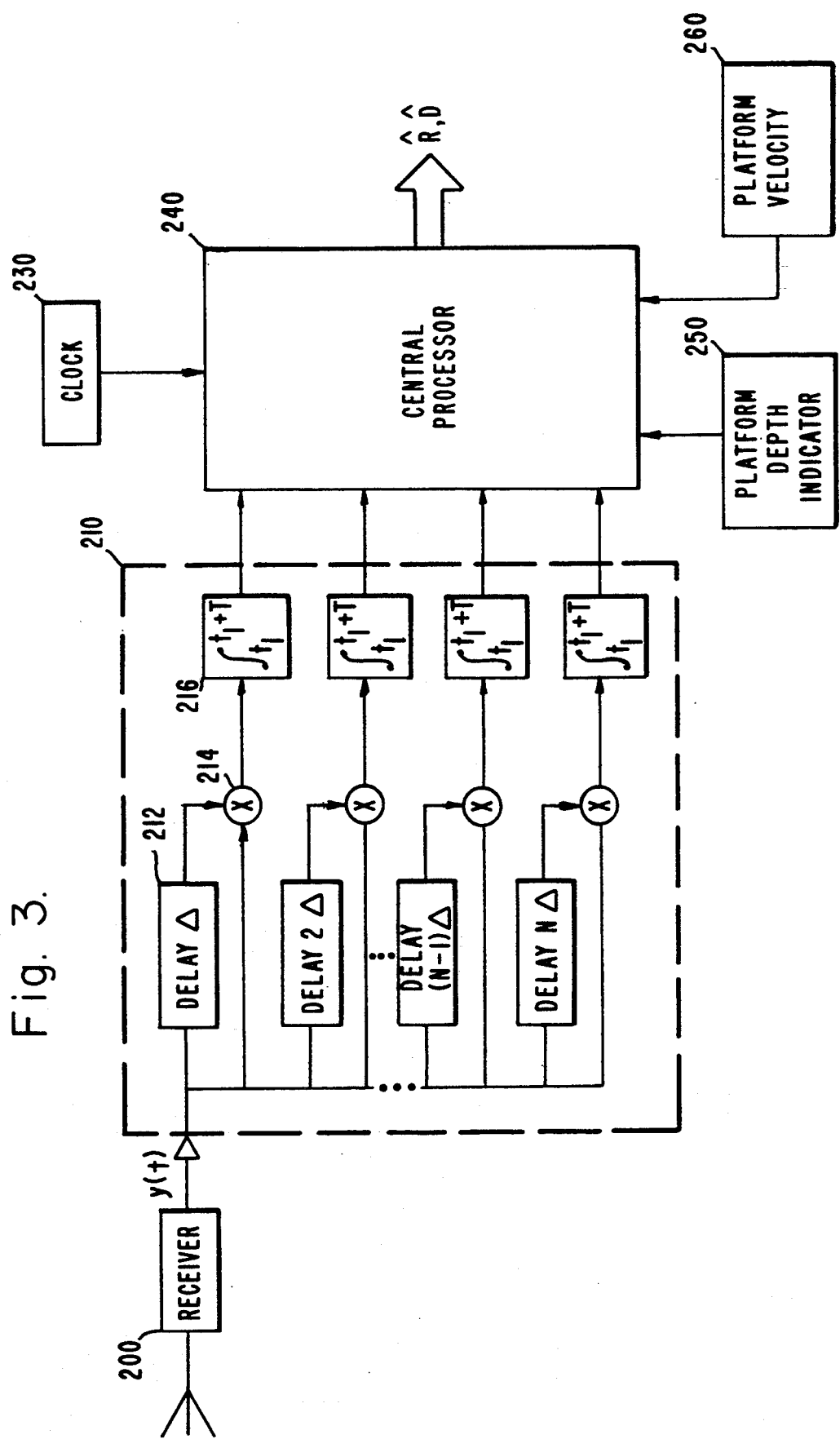
FIG. 3 is a block diagram of the preferred embodiment of the invention.

The operation of the preferred embodiment is further illustrated in FIG. 3. Sonar receiver 200 is coupled to an acoustic energy transducer, and provides an output receiver waveform y(t). The output of receiver 200 is coupled to correlator 210, which comprises a parallel bank of autocorrelators. Each autocorrelator comprises a delay element 212 for delaying the signal y(t) a predetermined time, a mixer 214 for mixing the signal y(t) and the delayed counterpart signal to provide a product signal y(t)y(t+delay), and an integrator or smoother circuit 216 adapted to provide a good estimate of the product. The integrator 216 integrates the product signal over a time T, whose value is selected to provide a good estimate on the peak.

Each of the autocorrelators is adapted to introduce a time delay which is an integral multiple of a constant delay $\Delta$. Thus, for the bank of N autocorrelators illustrated in FIG. 3, the first autocorrelator introduces a delay of $\Delta$ seconds, the second autocorrelator introduces a delay of $2 \Delta$ seconds, and the Nth autocorrelator introduces a delay of $N \Delta$ seconds. The magnitude of $\Delta$ determines the resolution of correlator 210.

The outputs of each of the autocorrelators is provided to central processor 240. Clock 230, platform depth indicator 250 and platform velocity indicator 260 are also coupled to processor 240, to provide signals representative of time, platform depth and platform velocity.

The processsor 240 is adapted to read the values of each autocorrelator and to identify, for a given time $t_i$, the autocorrelator whose output is the largest value. The delay introduced by the selected autocorrelator is determined to be the delay estimate $\Delta(t_i)$ for the given time $t_i$.

The actual implementation of the processor and correlator is a manner of choice, as each of the components comprising the correlator, as well as processors, are well known to those skilled in the art. For example, a preferred implementation of the correlator comprises a shift register, with each autocorrelator delayed term being taken off a tapped delay line.

Figure 4:
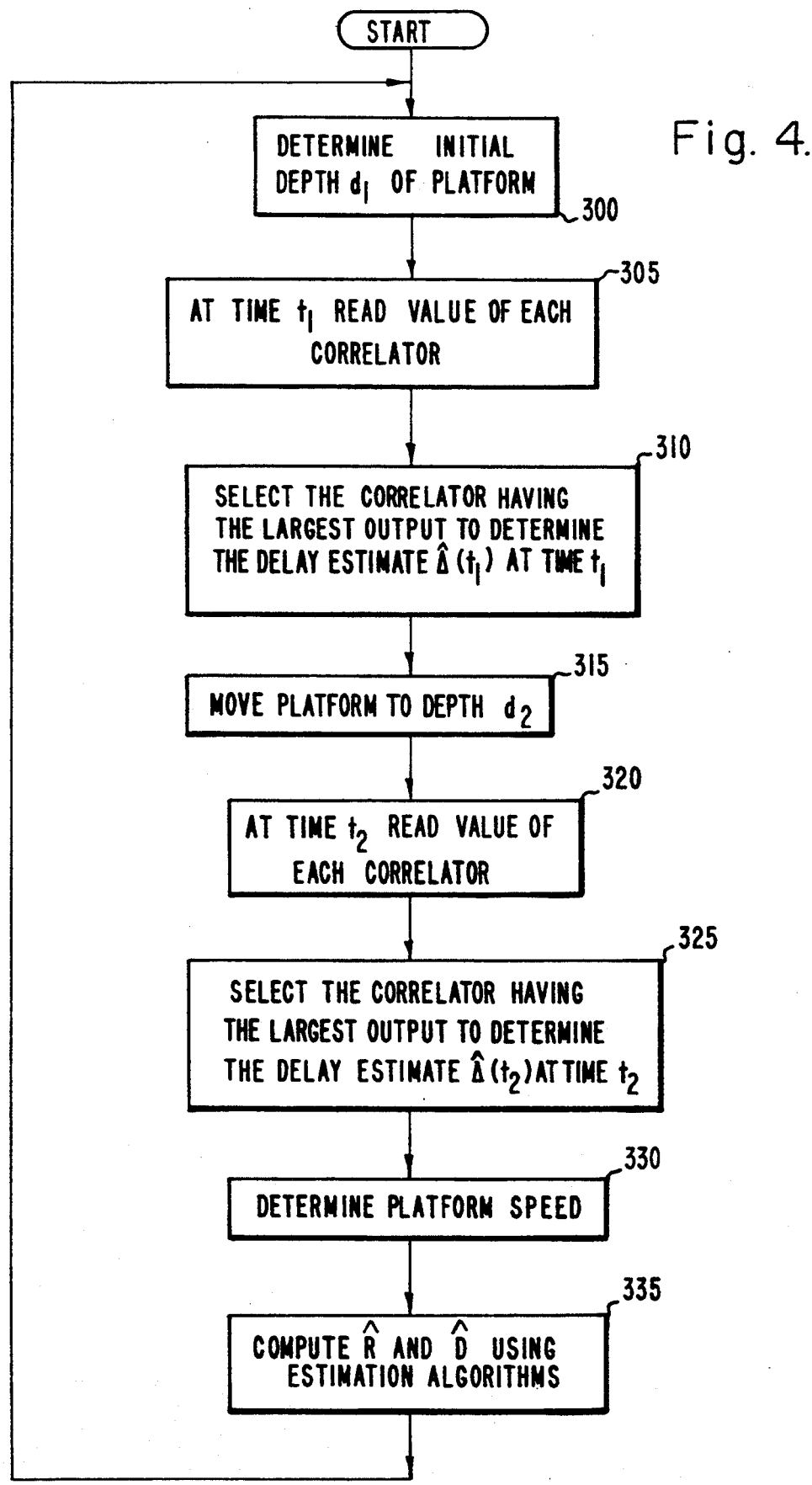
FIG. 4 is a flow chart illustrating the operations of the preferred embodiment of the invention.

The operation of the invention is further illustrated by the flow chart of FIG. 4. At step 300 and the commencement of operation, the platform is at initial depth $d_1$; the processor determines this depth and stores it for subsequent use in the estimation algorithms. At step 305, the processor reads the value of each autocorrelator at time $t_1$. At step 310, the processor selects the largest autocorrelator output to determine the appropriate time delay estimate $\Delta(t_1)$, and stores this estimate for subsequent use.

At step 315, the platform is moved to depth $d_2$. At time $t_2$, during step 320, the processor reads the value of each autocorrelator output. At step 325, the correlator having the largest output value is selected to determine the appropriate delay estimate at time $t_2$, $\Delta(t_2)$.

At step 330, the platform speed is determined. After this step, the processor has the necessary information to carry out the estimation algorithms of Equation 8 and 9.

The invention may also be viewed as a method for estimating the target range and depth. The method comprises the steps of: (a) positioning a passive sonar receiver at a first depth; (b) determining an estimate of the difference in acoustic energy propagation time for a direct propagation path and a surface reflected path at time $t_1$; (c) positioning the sonar receiver at a second depth $d_2$; (d) determining an estimate of such difference at time $t_2$; (e) determining the sonar receiver's velocity, and (f) calculating estimates of the target's range and depth utilizing the estimation algorithms of Equations 8 and 9.

It is understood that the above-described embodiment is merely illustrative of the many possible specific embodiments which can represent applications of the present invention. Numerous and varied other arrangements can be readily devised in accordance with these principles by those skilled in the art without departing from the spirit and scope of the invention.

What is claimed is:

1. A passive sonar system adapted to provide estimates of a target location, comprising:
    (a) receiver means adapted to receive acoustic energy from such target and provide receiver signal;
    (b) receiver positioning means adapted to move said receiver means from a first depth to a second depth; and
    (c) processing means coupled to said receiver means and adapted to process the receiver signals generated by said receiver at said first depth and at said second depth, and provide sonar signals indicative of the target's location.

2. The sonar system of claim 1 wherein said sonar signals are indicative of estimates of the target's range from the receiver and its depth from the surface.

3. The sonar system of claim 2 wherein said processing means comprises means for approximating the acoustic propagation time differential between two possible acoustic propagation paths at said first depth and at said second depth.

4. The sonar system of claim 3 wherein said means for approximating the time differential comprises correlator means adapted to estimate a delay time value which provides a relative maximum in the autocorrelation of the receiver signals.

5. The sonar system of claim 4 wherein said correlator means includes a plurality of autocorrelator means, each respectively adapted to determine the autocorrelation of the receiver signal as a function of predetermined time delay values.

6. The sonar system of claim 3 wherein said processor means comprises computer means for determining an estimate $\hat{R}$ of the range from the algorithm $$\hat{R} = \frac{v(t_2 - t_1) \Delta(t_2) d_1}{\Delta(t_2) d_2 - \Delta(t_1) d_2}$$

where v is the velocity of the receiver means, $t_1$ is the time at which the receiver measurement at the first depth $d_1$ occurs, $t_2$ is the time at which the receiver measurements at the second depth $d_2$ occurs, $\Delta(t_1)$ is the measured time differential at said first depth $d_1$, and $\Delta(t_2)$ is the measured time differential at said second depth $d_2$.

7. The sonar system of claim 6 wherein said processor means further comprises computer means for carrying out the following algorithm for determining an estimate $\hat{D}$ of the target depth:

$$\hat{D} = \frac{\hat{R} \Delta(t_1) c}{2 d_1}$$

where c is the speed of sound in the medium.

8. A method of estimating target depth and range using a dual depth sonar, comprising the steps of:
    (a) positioning a sonar receiver at a first depth $d_1$;
    (b) determining a first estimate $\Delta(t_1)$ of the difference in the acoustic energy propagation times for a direct propagation path and a surface reflected path at a first time $t_1$ and at said first depth;
    (c) positioning the sonar receiver at a second depth $d_2$;
    (d) determining a second estimate $\Delta(t_2)$ of said difference in propagation times at a second time $t_2$ and at said second depth;
    (e) determining an estimate of the sonar receiver's velocity; and
    (f) calculating an estimate of the target's range from the sonar receiver, based upon said first and second estimates of the difference in propagation times, said estimate of sonar receiver velocity, and the time interval from said first time $t_1$ said second time $t_2$.

9. The method of claim 8 wherein said step of calculating estimates of the target's range comprises providing a processor means adapted to calculate the estimate R of the range from the following alogirthm:

$$R = \frac{v(t_2 - t_1) \Delta(t_2) d_1}{\Delta(t_2) d_1 - \Delta(t_1) d_2}$$

where v is the velocity of the receiver means, $t_1$ is the time at which the receiver measurement at the first depth $d_1$ occurs, $t_2$ is the time at which the receiver measurements at the second depth $d_2$ occurs, $\Delta(t_1)$ is the measured time differential at said first depth $d_1$, and $\Delta(t_2)$ is the measured time differential at said second depth $d_2$.

10. The method of claim 8 further comprising the step of:
    calculating an estimate of the target's depth $\hat{D}$, based upon said estimate of the target's range $\hat{R}$, the velocity c of acoustic energy propagation in the medium, and said receiver first depth $d_1$.

11. The method of claim 10 wherein said step of calculating the target depth comprises providing a processor adapted to calculate an estimate $\hat{D}$ of the target's depth using the following algorithm:

$$\hat{D} = \frac{\hat{R} \Delta(t_1) c}{2 d_1}$$

where c is the speed of sound in the medium.

* * * * *